United States Patent [19]
Leibowitz

[11] 3,915,555
[45] Oct. 28, 1975

[54] LIQUID CRYSTAL DISPLAY

[75] Inventor: Marshall Leibowitz, Englewood, N.J.

[73] Assignee: Timex Corporation, Waterbury, Conn.

[22] Filed: July 22, 1974

[21] Appl. No.: 489,297

[52] U.S. Cl. ............ 350/160 LC; 324/96; 324/109; 350/267
[51] Int. Cl.² ............................................. G02F 1/13
[58] Field of Search ............. 350/150, 160 LC, 267; 324/96, 109

[56] References Cited
UNITED STATES PATENTS
3,772,874  11/1975  Lefkowitz ........................ 58/50 R

*Primary Examiner*—Edward S. Bauer

[57] ABSTRACT

A liquid crystal display comprises a field effect liquid crystal material and an electrically and chemically inert immiscible fluid contained between two vertical transparent conducting plates having a thin non-conductive stripe down one of the plates. An electric voltage applied perpendicular to the plates causes the liquid crystal level to move up or down depending upon whether the inert fluid is more or less dense than the liquid crystal. When the liquid crystal material moves up or down in the conductive area, it will move in the opposite direction in the non-conductive area as a function of the applied voltage with the liquid crystal being replaced by the inert material in the up direction and vice versa. Since the height change is related to the applied voltage, the display may be used for instrument displays, linear clock displays and the like.

9 Claims, 4 Drawing Figures

3,915,555

LIQUID CRYSTAL DISPLAY

BACKGROUND OF THE INVENTION

The present invention relates to displays and particularly to liquid crystal displays such as instrument displays or linear clock displays wherein a linear indication is provided. The prior art includes U.S. Pat. No. 3,705,310 to Wild, issued Dec. 5, 1972 which discloses a liquid crystal voltage display having means whereby the liquid crystal becomes visible in response to the applied voltage.

U.S. Pat. No. 3,774,195 to Schulthess et al, issued Nov. 30, 1973, discloses a liquid crystal display which may be used for indicating voltage by means of a visible line or bar.

U.S. Pat. No. 3,667,039 to Garfein et al, issued May 30, 1972, pertains to electricity measurement devices employing liquid crystalline materials wherein the liquid crystal material becomes visible in response to a signal and appears to be moveable along a scale giving a visual indication of the applied voltage.

Other prior art of interest are U.S. Pat. No. 3,626,410 to de Koster, issued Dec. 7, 1971, U.S. Pat. No. 3,627,408 to Fergason, issued Dec. 14, 1971, and U.S. Pat. No. 3,675,988 to Soref, issued July 11, 1972. The above prior art is merely representative of the pertinent patents in the area of the present invention and is not intended to be an all-inclusive listing of the pertinent prior art.

The prior art patents in general depend either on a voltage gradient introduced on some point into the liquid crystal display resulting in different excitation parameters along a bar graph or on discrete segments which are sequentially excited. The present invention, however, is based upon a pumping effect in liquids on high dielectric constant and the motion thereby induced which causes a change in height of the liquid crystal and inert fluids.

SUMMARY OF THE INVENTION

The present invention relates to a display suitable for instruments and linear clocks, etc. which comprises a field effect liquid crystal material and an inert immiscible fluid contained between two vertical transparent conducting plates having a thin non-conductive stripe down one of the plates. An electric voltage applied perpendicular to the plates causes a change in height of the liquid crystal or optical rotator material and the inert or non-optical rotator fluid. The change in height is a measure of the applied voltage and is visible through polarizing plates mounted adjacent the vertical transparent conducting plates. The respective fluids are arranged so that a small change in height in the electrically active fluid will induce a much larger change in height in the non-susceptible fluid. Since the height rise is related to the applied voltage, any function that can be expressed as a voltage change can be displayed as a specific height rise on a bar graph.

Accordingly, an object of this invention is to provide a new and improved liquid crystal display.

Another object of this invention is to provide a new and improved liquid crystal display wherein a change in height is effected in respective rotator and non-optical rotator fluids when an electric voltage is introduced perpendicular to the plates.

A further object of this invention is to provide a new and improved liquid crystal display wherein a liquid crystal material and an inert immiscible fluid are positioned between two plates, one of said plates having a non-conductive stripe thereon so that a change in height of the respective fluids is effected by the application of a voltage perpendicular to the plates.

BRIEF DESCRIPTION OF THE DRAWINGS

Other objects and advantages of this invention may be seen from the following description when viewed in conjunction with the accompanying drawings, wherein.

DETAILED DESCRIPTION OF THE INVENTION

Figure 1:
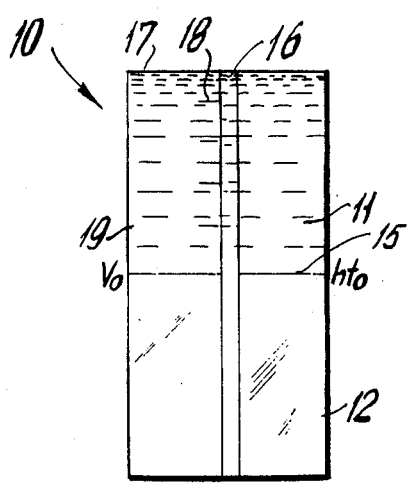
FIG. 1 is a front view of the display with the inert fluid in the bottom of the non-conductive stripe.

Referring now to the drawings, the invention comprises a liquid crystal display 10 having a liquid crystal material 11 which may be of the field effect type and an inert immiscible fluid 12 contained between two sealed parallel conductive plates 13 and 14. The plates 13 and 14 are preferably oriented in a vertical position with the lesser density liquid crystal material 11 on top of the greater density inert immiscible fluid 12 due to respective densities. The fluid 12 is selected so that the liquid crystal level will move up and down between the plates 13 and 14 in a predetermined manner as will hereinafter be described.

A thin non-conductive stripe 16 is located on one of the plates 13 generally in a vertical position running from the top 17 of the display 10 to at least the boundary 15 between the liquid crystal layer 11 and the inert fluid 12. Indicia 18 may be located on the plate 13 so that direct readings may be made of a particular parameter related to the height of the inert fluid 12, along the stripe 16.

Liquid crystals, especially the type used in field effect displays have relatively high dielectric constants. The inert fluid is chosen for its low dielectric constant. A typical inert fluid would be a fluorocarbon electronic liquid or a silicone fluid immiscible with the liquid crystal.

When an electric voltage is applied perpendicular to the conductive plates 13 and 14, the liquid crystal because of its higher dielectric constant moves out of the area of the non-conducting stripe into the area of the field. When the liquid crystal material 11 is made to move up in the conductive area, it will move in the opposite direction in the non-conductive area being replaced on the stripe 16 by the inert fluid 12. The rise in height of the liquid crystal material 11 is proportional to the applied voltage. The ratio of the conductive width, that is, the width of plates 13 and 14 to the width of the non-conductive stripe 16 is rather large. As a result, a small change in the liquid crystal height in the conductive area will cause a large change in the non-conductive area.

The liquid crystal material 11 aligned by the Schadt-Helfrich or a similar method is an optical rotator while the inert material 12 is not. Consequently, polarizing elements 19 and 21 are mounted adjacent the plates 13 and 14 respectively. Viewing the display 10 through such polarizing elements 19 and 21 shows a height rise in the liquid crystal material 11 which is proportional to applied voltage with extremely good contrast.

Figure 2:
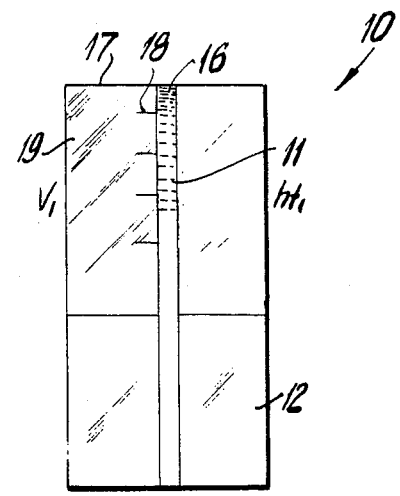
FIG. 2 shows the inert fluid at height $Ht_1$ under an applied voltage $V_1$.
Figure 3:
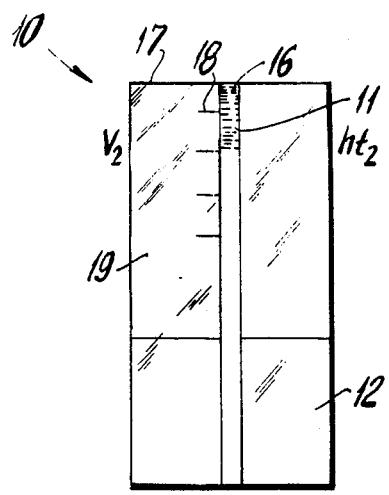
FIG. 3 represents the inert fluid at a height of $Ht_2$ with the application of a voltage $V_2$; and, FIG. 4 is a side view of the display of FIG. 1.
Figure 4:
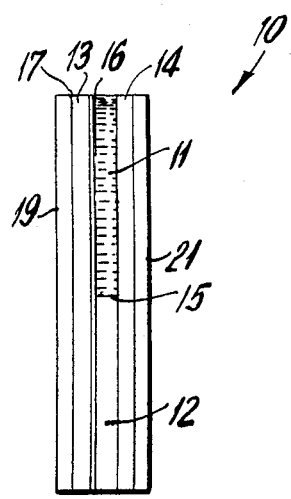

Since the aligned liquid crystal material is a rotator, it will appear dark when viewed through the polarizing elements and no voltage is applied, while the inert fluid will appear transparent, as shown in FIG. 1. In FIGS. 2 and 3, when the threshold voltage is exceeded, the liquid crystal material in the conductive area of the plates will also become transparent leaving the liquid crystal material over the non-conductive stripe in the darkened condition, providing good contrast.

FIG. 1 shows the display 10 with the applied voltage of $V_o$, the threshold voltage. The height of the inert material 12 along the non-conductive stripe 16 is at $ht_0$ signifying no rise in height. In FIG. 2 and FIG. 3, the voltages of $V_1$ and $V_2$ create height levels of $ht_1$ and $ht_2$ respectively where $V_2>V_1>V_0$. Since the height rise is proportional to the applied voltage, any function that could be expressed as a voltage change can be displayed as a specific height rise on a bar graph with indicia 18 located on one of the plates 13.

The invention is based upon a pumping effect in liquids of high dielectric constant and the motion thereby induced. The applied voltage causes a change in height of the optical rotator and non optical rotator fluids 11 and 12 respectively, which is visible when viewed through polarizing elements 19 and 21.

Further embodiments of the present invention could use other liquid crystal modes such a dynamic scattering or phase transition. In these cases (not shown), however, the stripe 16 on one of the glass plates 13 or 14 would be a thin conductive stripe and there would be a non-conductive area on the said plate. The liquid crystal 11 would then move up or down the conductive stripe 16 and could be viewed directly. Also, an inert fluid of lesser density than the liquid crystal material could be used in which case the positions and directions of movement would be reversed.

It is to be understood that the above-described arrangements are merely illustrative examples of the application. Numerous other arrangements may be readily devised by those skilled in the art which will embody the principles of the invention and fall within the spirit and scope thereof.

What is claimed is:

1. A liquid crystal display comprising:
   two vertical transparent conducting plates,
   a thin non-conductive stripe located in a substantaially vertical position on one of said plates,
   a field effect liquid crystal material and an electrically and chemically inert immiscible fluid contained between the plates, said material and said fluid having different densities, and,
   means for applying an electric voltage perpendicular to the plates wherein the liquid crystal material moves up or down between the plates as a function of the applied voltage and in the opposite direction on the non-conductive stripe so that the height change on the stripe may be used for display purposes.

2. A liquid crystal display in accordance with claim 1 further including:
   means for sealing said display at the ends of the vertical plates and a polarizing member mounted adjacent each of said plates for viewing the display.

3. A liquid crystal display in accordance with claim 2 wherein:
   the width of the conducting plates is relatively large in relation to the non-conductive stripe so that a small change in height of the liquid crystal material due to the applied voltage in the conductive area induces a much larger change in height in the non-conductive area.

4. A liquid crystal display in accordance with claim 2 wherein:
   scale indicia are located opposite the thin conductive stripe on one of the plates so that the changes in height of liquid crystal material can be related directly to a particular measured value.

5. A liquid crystal display in accordance with claim 2 wherein:
   the plates are of conductive glass and the inert fluid is denser than the liquid crystal material so that the inert fluid is located at the bottom of the display between the plates.

6. A liquid crystal display in accordance with claim 2 wherein:
   the liquid crystal material is of phase transition mode and wherein the stripe on one of said plates is a thin conductive stripe and the plates include a relatively large non-conductive area such that the liquid crystal material moves up or down the stripe in a predetermined manner upon the application of voltage thereto.

7. A liquid crystal display in accordance with claim 2 wherein:
   the inert fluid has a greater density than the liquid crystal material.

8. A liquid crystal display in accordance with claim 2 wherein:
   the inert fluid has a lesser density than the liquid crystal matter.

9. A liquid crystal display in accordance with claim 1 wherein:
   the liquid crystal material is of a dynamic scattering mode and wherein the stripe on one of said plates is a thin conductive stripe and the plates include a relatively large non-conductive area such that the liquid crystal material moves up or down the stripe upon the application of voltage thereto.

* * * * *